US012159537B2

(12) United States Patent
Rezvani et al.

(10) Patent No.: US 12,159,537 B2
(45) Date of Patent: Dec. 3, 2024

(54) GENERATING DYNAMIC CHECKLISTS FOR AIRCRAFT OPERATIONS

(71) Applicant: WING AVIATION LLC, Mountain View, CA (US)

(72) Inventors: Tara Sheida Rezvani, Los Gatos, CA (US); Jonathan Lesser, Oakland, CA (US); Reinaldo Negron, Jr., San Francisco, CA (US); Shruthi Baskaran, San Carlos, CA (US); Sung Roa Yoon, Mountain View, CA (US); Arnaud Caron, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 0 days.

(21) Appl. No.: 18/352,910

(22) Filed: Jul. 14, 2023

(65) Prior Publication Data

US 2023/0368680 A1 Nov. 16, 2023

Related U.S. Application Data

(63) Continuation of application No. 17/187,613, filed on Feb. 26, 2021, now Pat. No. 11,749,121.

(51) Int. Cl.
*G08G 5/00* (2006.01)

(52) U.S. Cl.
CPC ........... *G08G 5/003* (2013.01); *G08G 5/0013* (2013.01); *G08G 5/0026* (2013.01); *G08G 5/006* (2013.01);
(Continued)

(58) Field of Classification Search
CPC .... G08G 5/003; G08G 5/0013; G08G 5/0026; G08G 5/006; G08G 5/0069; G08G 5/0091
See application file for complete search history.

(56) References Cited

U.S. PATENT DOCUMENTS 9,626,874 B1 4/2017 Gupta et al.
9,830,564 B2 * 11/2017 Small .................... G06Q 10/06
(Continued)

FOREIGN PATENT DOCUMENTS

EP 3203459 A2 8/2017

OTHER PUBLICATIONS

International Search Report and Written Opinion mailed Apr. 12, 2022, in corresponding International Patent Application No. PCT/US2021/064202, 14 pages.

(Continued)

*Primary Examiner* — Shon G Foley
(74) *Attorney, Agent, or Firm* — Christensen O'Connor Johnson Kindness PLLC

(57) ABSTRACT

In some embodiments, a mobile computing device comprising one or more processors, a display, and a non-transitory computer-readable medium is provided. The computer-readable medium has logic stored thereon that, in response to execution by the one or more processors, causes the mobile computing device to perform actions comprising: determining, by the mobile computing device, a location associated with flight plan information; transmitting, by the mobile computing device, the location to a restriction management system; receiving, by the mobile computing device from the restriction management system, information for presenting a checklist including checklist items indicating statuses of flight restriction conditions associated with the location; generating, by the mobile computing device, an interface having a format based on whether all checklist items are passed, wherein the interface includes a map, a pin, and a checklist; and presenting, by the mobile computing device, the interface on the display.

18 Claims, 11 Drawing Sheets

(52) U.S. Cl.
CPC ......... *G08G 5/0069* (2013.01); *G08G 5/0091* (2013.01)

(56) References Cited

U.S. PATENT DOCUMENTS

| | | | |
|---|---|---|---|
| 10,354,536 | B1 | 7/2019 | Hegranes et al. |
| 2016/0125741 | A1 | 5/2016 | Shorter, Jr. et al. |
| 2016/0189549 | A1 | 6/2016 | Marcus |
| 2016/0364989 | A1 | 12/2016 | Speasl et al. |
| 2019/0383627 | A1 | 12/2019 | Nangeroni et al. |
| 2020/0010071 | A1 | 1/2020 | Brancato |
| 2020/0116492 | A1 | 4/2020 | Scott |
| 2020/0168104 | A1 | 5/2020 | Holder et al. |
| 2020/0250996 | A1 | 8/2020 | Hegranes et al. |
| 2020/0324899 | A1 | 10/2020 | Geng |
| 2020/0357286 | A1 | 11/2020 | Liu et al. |

OTHER PUBLICATIONS

Office Action mailed May 31, 2024, in corresponding Australian Patent Application No. 2021430302, filed Dec. 17, 2021, 4 pages.

* cited by examiner

GENERATING DYNAMIC CHECKLISTS FOR AIRCRAFT OPERATIONS

CROSS REFERENCE TO RELATED APPLICATION

This application is a continuation of U.S. application Ser. No. 17/187,613, filed Feb. 26, 2021, the entire disclosure of which is hereby incorporated by reference herein for all purposes.

TECHNICAL FIELD

This disclosure relates generally to aircraft operations, and in particular but not exclusively, relates to operating unmanned aerial vehicles (UAV).

BACKGROUND

The use of aircraft, including for both recreational purposes and for commercial purposes, is becoming increasingly prevalent. As the cost of operating aircraft continues to fall and the ease of operation increases, many new pilots are starting to take part in flight operations. One barrier to entry for new pilots—and an ongoing struggle for even experienced pilots—is being able to properly ensure that a planned flight does not violate any flight restrictions. Even when a pilot can properly review all relevant flight restrictions for a planned flight area before a given flight, there is currently no way for the pilot to remain informed of changes to the relevant flight restrictions between planning and takeoff. The increased use of mobile devices with small, touch-only interfaces only exacerbates these problems.

What is desired are systems that can allow both experienced and novice pilots to easily plan flights to avoid violation of flight restrictions, even when using mobile devices with small touch-only interfaces. What is also desired are systems that will monitor for changes in relevant flight restrictions and proactively notify a pilot when changes are detected before and/or during a flight.

BRIEF SUMMARY

In some embodiments, a mobile computing device comprising one or more processors, a display, and a non-transitory computer-readable medium is provided. The computer-readable medium has logic stored thereon that, in response to execution by the one or more processors, causes the mobile computing device to perform actions comprising: determining, by the mobile computing device, a location associated with flight plan information; transmitting, by the mobile computing device, the location to a restriction management system; receiving, by the mobile computing device from the restriction management system, information for presenting a checklist including checklist items indicating statuses of flight restriction conditions associated with the location; generating, by the mobile computing device, an interface having a format based on whether all checklist items are passed, wherein the interface includes a map, a pin, and a checklist; and presenting, by the mobile computing device, the interface on the display.

In some embodiments, a non-transitory computer-readable medium having logic stored thereon is provided. The logic, in response to execution by one or more processors of a mobile computing device, causes the mobile computing device to perform actions comprising: determining, by the mobile computing device, a location associated with flight plan information; transmitting, by the mobile computing device, the location to a restriction management system; receiving, by the mobile computing device from the restriction management system, information for presenting a checklist including checklist items indicating statuses of flight restriction conditions associated with the location; generating, by the mobile computing device, an interface having a format based on whether all checklist items are passed, wherein the interface includes a map, a pin, and a checklist; and presenting, by the mobile computing device, the interface on a display device of the mobile computing device.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

Figure 1:
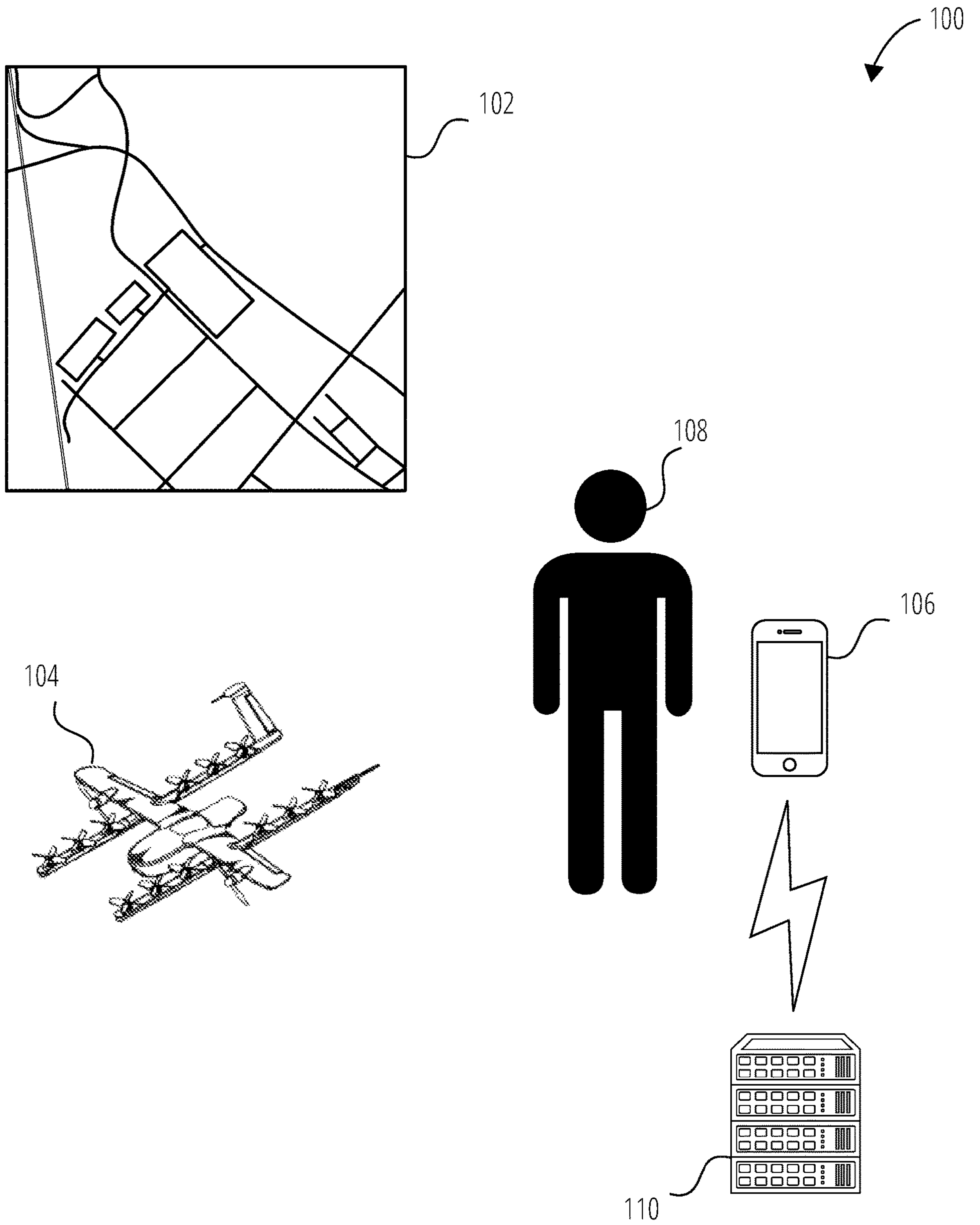
FIG. 1 is a schematic illustration of a system for managing flight operations according to various aspects of the present disclosure.

FIG. 1 is a schematic illustration of a system for managing flight operations according to various aspects of the present disclosure. As shown, the system 100 includes a pilot 108 who wishes to operate an aircraft 104 within an area of operations 102 (illustrated as an overhead map view). Typically, flying an aircraft within the area of operations 102 will be subject to various regulations issued by local authorities, national authorities, licensing bodies, and other entities. However, these various regulations are not generally postable in an easy-to-review format, particularly for a pilot 108 using a user device 106 such as a smartphone or other mobile device for communications.

In embodiments of the present disclosure, a restriction management system 110 is provided that collects flight restrictions relevant to the use of the aircraft 104 by the pilot 108 in the area of operations 102, and provides information that allows the user device 106 to present the restriction information in a format easy to consume on the user device 106. Further, the restriction management system 110 continues to monitor restriction information for a planned flight to check for any changes and will transmit a notification to the user device 106 if the restrictions change in a meaningful way, thus allowing the pilot 108 to plan a flight far in advance without having to repeatedly re-check the plan to ensure that the planned flight will still be allowable.

Figure 2:
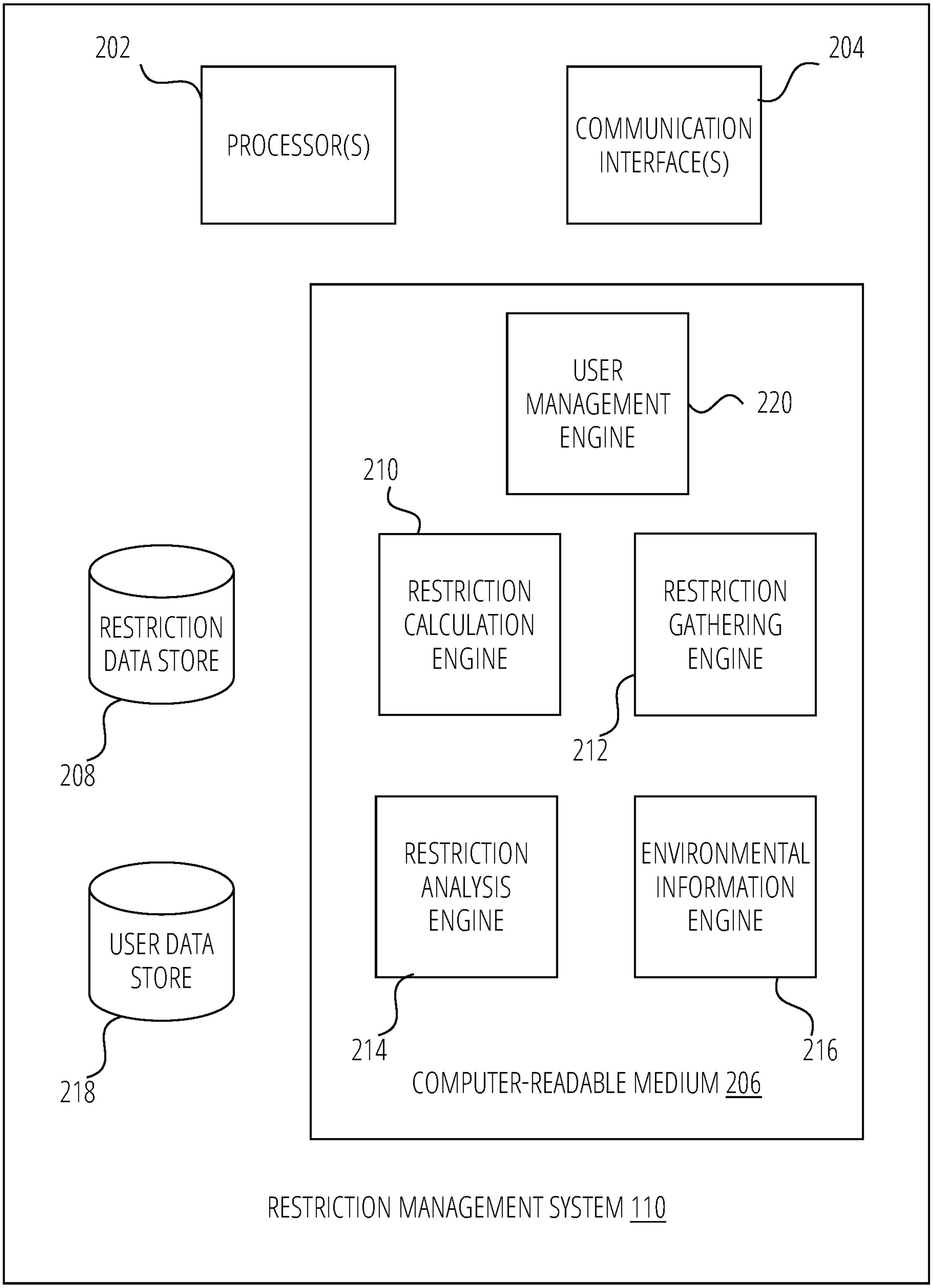
FIG. 2 is a block diagram that illustrates aspects of a non-limiting example embodiment of a restriction management system according to various aspects of the present disclosure.

FIG. 2 is a block diagram that illustrates aspects of a non-limiting example embodiment of a restriction management system according to various aspects of the present disclosure. The illustrated restriction management system 110 may be implemented by any computing device or collection of computing devices, including but not limited to a desktop computing device, a laptop computing device, a mobile computing device, a server computing device, a computing device of a cloud computing system, and/or combinations thereof. The restriction management system 110 is configured to generate dynamic checklists by determining restrictions that are relevant to a planned flight area during a planned flight period of time, and providing information associated with those restrictions for presentation to a user. In some embodiments, the restriction management system 110 is also configured to monitor for changes in the determined restrictions before and during the planned flight period of time, and to notify the user in the event that a change is detected.

As shown, the restriction management system 110 includes one or more processors 202, one or more communication interfaces 204, a restriction data store 208, a user data store 218, and a computer-readable medium 206.

In some embodiments, the processors 202 may include any suitable type of general-purpose computer processor. In some embodiments, the processors 202 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 204 include one or more hardware and or software interfaces suitable for providing communication links between components. The communication interfaces 204 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 206 has stored thereon logic that, in response to execution by the one or more processors 202, cause the restriction management system 110 to provide a user management engine 220, a restriction gathering engine 212, a restriction calculation engine 210, a restriction analysis engine 214, and an environmental information engine 216.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the user management engine 220 is configured to create and manage records for users stored in the user data store 218. The user records may include information such as pilot attributes for a pilot, aircraft attributes for aircraft to be operated by the pilot, contact information for the pilot (including but not limited to one or more addresses to which notifications can be transmitted), and/or other information.

In some embodiments, the restriction gathering engine 212 is configured to retrieve information from other sources that represents restriction information, and to store corresponding restriction definitions in the restriction data store 208. In some embodiments, the restriction gathering engine 212 may provide a user interface that allows restriction information to be entered directly into the restriction management system 110, and may create and store restriction definitions based on the restriction information entered into the user interface.

In some embodiments, the environmental information engine 216 is configured to retrieve transient environmental information, including but not limited to weather condition information and/or weather prediction information, from external sources. In some embodiments, the restriction calculation engine 210 is configured to calculate restriction definitions that are based on transient information from other sources (such as information gathered by the environmental information engine 216), and to store the calculated restriction definitions in the restriction data store 208.

In some embodiments, the restriction analysis engine 214 is configured to generate and transmit information for presenting lists of checklist items. In some embodiments, the restriction analysis engine 214 is configured to determine which restriction definitions are relevant to a given planned flight area during a planned flight period of time, and to base the information for presenting the lists of checklist items on the relevant restriction definitions. In some embodiments, the restriction analysis engine 214 may also be configured to continue monitoring for updated restriction definitions that may be relevant before and during the planned flight period of time, and to transmit notifications to contact information stored in the user record in the user data store 218 when changes are detected.

Further description of the configuration of each of these components is provided below.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 3A:
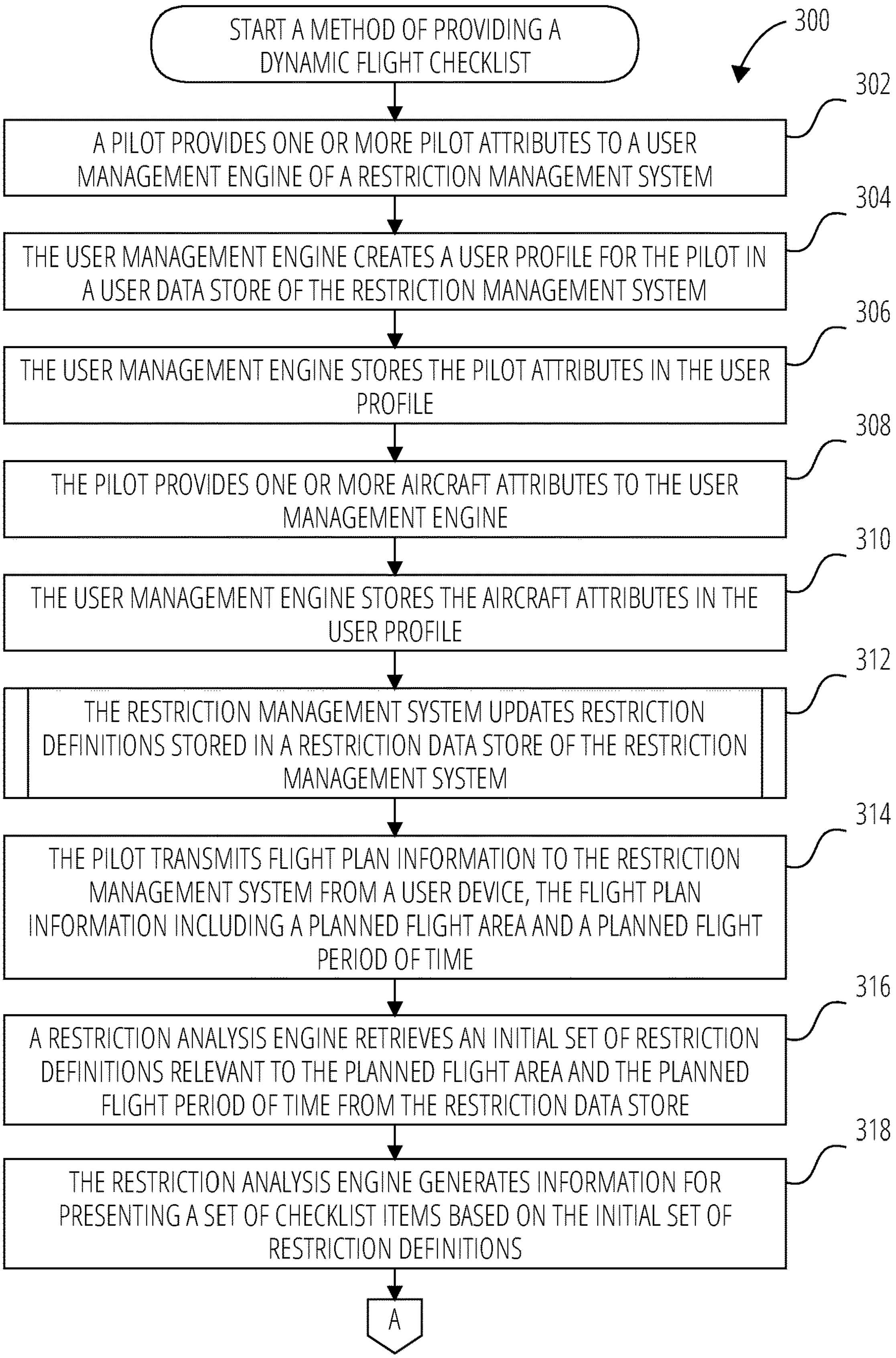
FIG. 3A-FIG. 3C are a flowchart that illustrates a non-limiting example embodiment of a method of providing a dynamic flight checklist according to various aspects of the present disclosure.
Figure 3B:
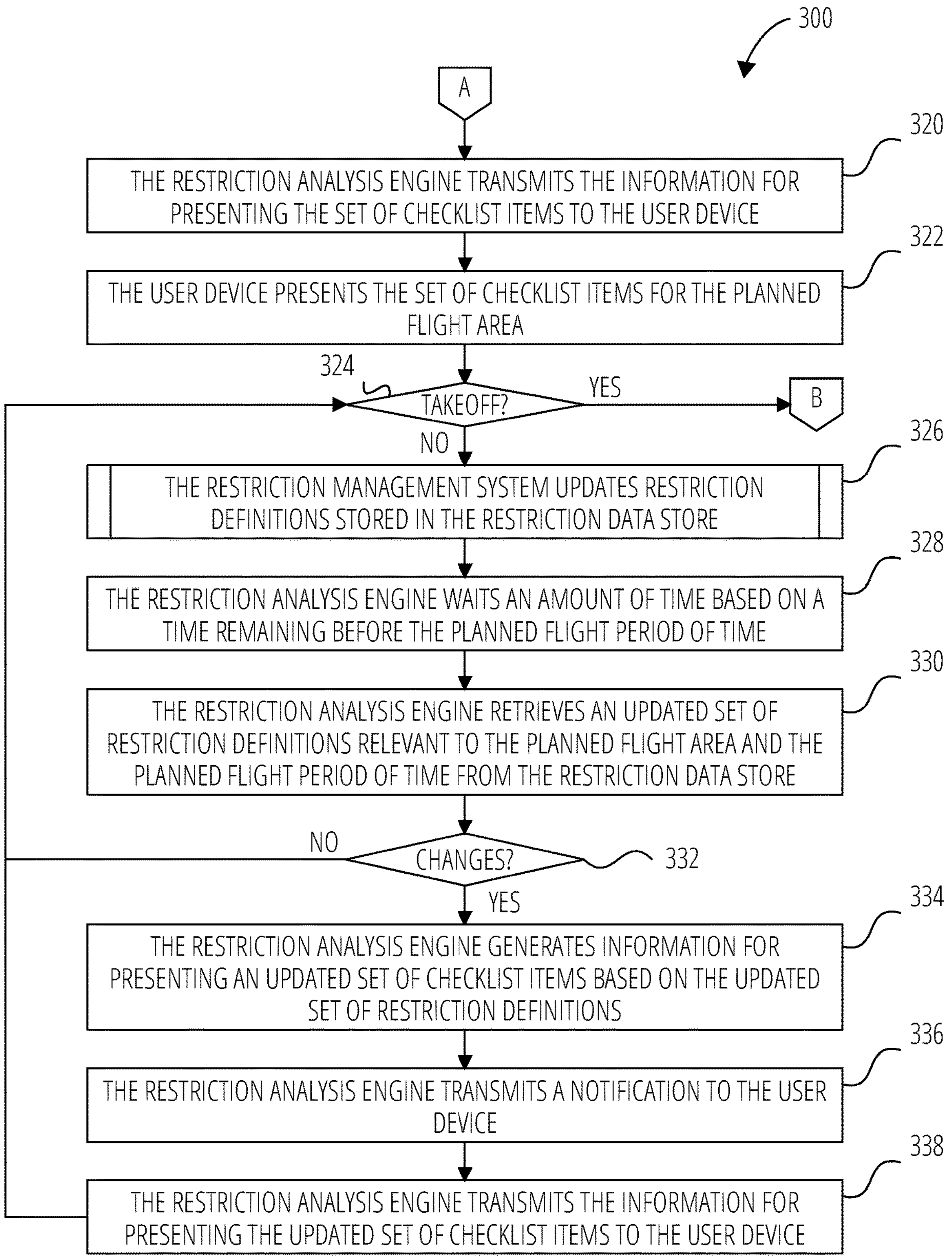
Figure 3C:
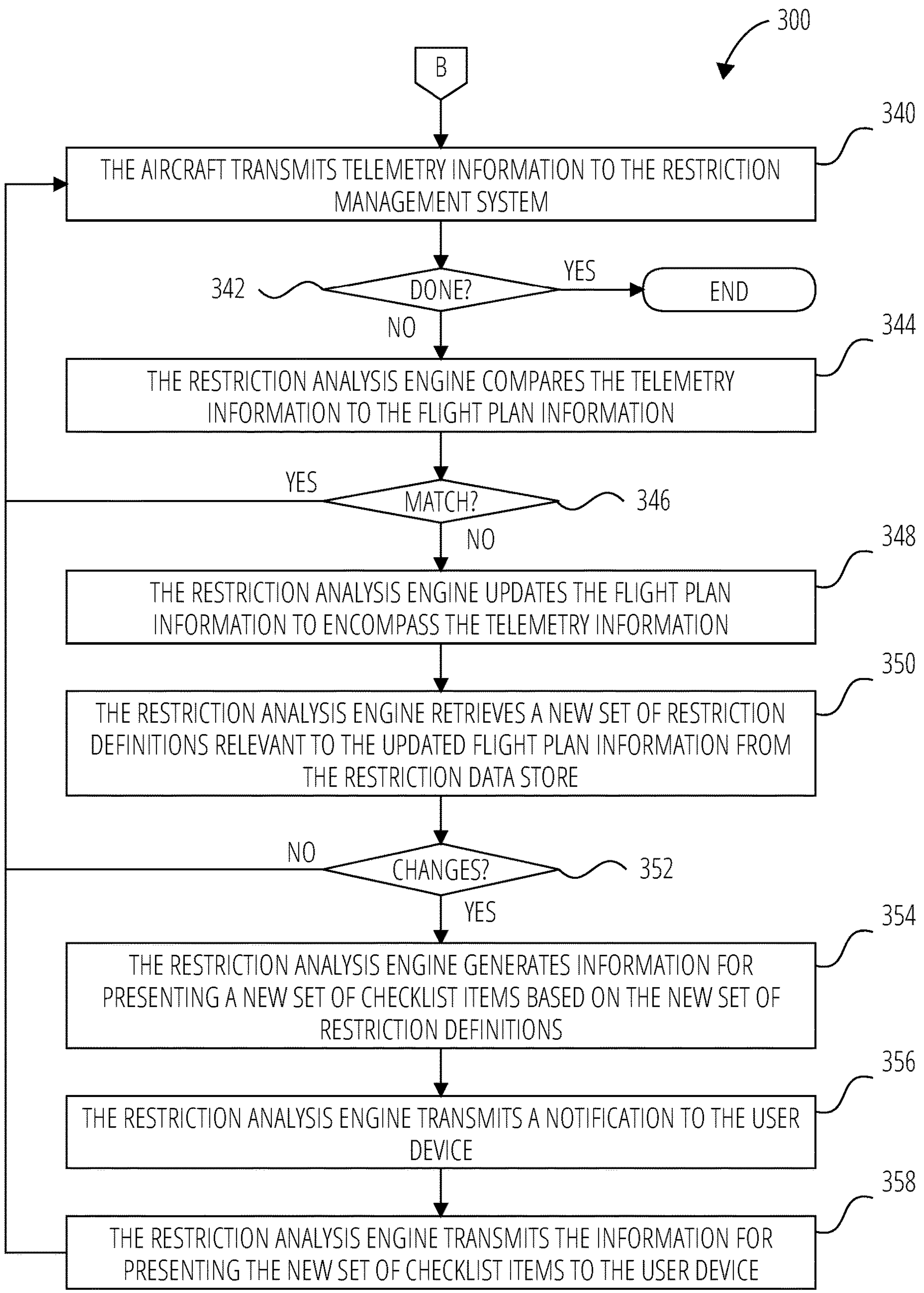

FIG. 3A-FIG. 3C are a flowchart that illustrates a non-limiting example embodiment of a method of providing a dynamic flight checklist according to various aspects of the present disclosure. In the method 300, the restriction management system 110 helps generate dynamic checklists that illustrate whether a planned flight will comply with various flight restrictions in the planned flight area, and also continues to monitor the flight restrictions in case there are changes before the planned flight period of time. By doing so, the restriction management system 110 helps a pilot 108 plan in advance for aircraft operations without having to repeatedly manually confirm that the plan is still valid before the planned flight period of time.

From a start block, the method 300 proceeds to block 302, where a pilot 108 provides one or more pilot attributes to a user management engine 220 of a restriction management system 110. At block 304, the user management engine 220 creates a user profile for the pilot 108 in a user data store 218 of the restriction management system 110, and at block 306, the user management engine 220 stores the pilot attributes in the user profile.

The pilot attributes may include characteristics of the pilot 108 that are relevant to determining whether a given flight restriction would apply to the pilot 108. For example, these pilot attributes may include, but are not limited to, a type of license held by the pilot 108, a license number of a license held by the pilot 108, a number of flight hours held by the pilot 108, how recently the pilot 108 has flown, a number of authorizations previously obtained by the pilot 108, a current location of the pilot 108, an age of the pilot 108, and a local time of the pilot 108. The pilot attributes may also include one or more pieces of data more directly relevant to operation of the restriction management system 110, including but not limited to a username/pas sword for the pilot 108 to access the restriction management system 110, contact information associated with the pilot 108, address information of a user device 106 of the pilot 108, device tokens for a notification service, and communication preferences for the pilot 108. By storing the contact information and/or address information for the pilot 108, the restriction management system 110 will be able to transmit notifications for presentation to the pilot 108 upon detecting changes in the restrictions determined for a planned flight.

At block 308, the pilot 108 provides one or more aircraft attributes to the user management engine 220, and at block 310, the user management engine 220 stores the aircraft attributes in the user profile. In some embodiments, the user management engine 220 may create a separate aircraft record in the user data store 218 (or another data store), and may associate the user profile with the aircraft record. Any aircraft attributes relevant to the operation of the restriction management system 110 may be provided by the pilot 108, including but not limited to one or more of an aircraft model, an aircraft type (e.g., fixed wing, rotary wing, etc.), an aircraft registration number, an aircraft weight or mass, an aircraft payload capacity, an aircraft maximum operating speed, an aircraft minimum operating speed, an aircraft minimum turning radius, an aircraft minimum operating altitude, an aircraft maximum operating altitude, an aircraft lighting configuration, an aircraft communication capability, an aircraft communication address, and one or more levels of aircraft autonomy.

At subroutine block 312, the restriction management system 110 updates restriction definitions stored in a restriction data store 208 of the restriction management system 110. On an initial execution of the method 300, the restriction data store 208 may be empty, and the procedure executed at subroutine block 312 may add an initial set of restriction definitions to the restriction data store 208. If the restriction data store 208 already includes one or more restriction definitions, the procedure executed at subroutine block 312 may modify or remove existing restriction definitions as well as adding new restriction definitions. Any suitable procedure may be used to update the restriction definitions at subroutine block 312, including but not limited to the procedure 500 illustrated in FIG. 5 and described in further detail below.

At block 314, the pilot 108 transmits flight plan information to the restriction management system 110 from a user device 106, the flight plan information including a planned flight area and a planned flight period of time. In some embodiments, the restriction management system 110 stores the flight plan information in association with the user profile, such that the restriction management system 110 will be able to communicate with the pilot 108 regarding the planned flight using the contact information in the user profile.

In some embodiments, the user device 106 presents a user interface that allows the pilot 108 to specify the planned flight area in any suitable two-dimensional or three-dimensional format. In some embodiments, the user interface allows the pilot 108 to specify a point on a map and a radius around the point to define the planned flight area. In some embodiments, the user interface allows the pilot 108 to draw boundaries of the planned flight area on a map. In some embodiments, the user interface allows the pilot 108 to specify a start location, an end location, and an optional set of waypoints between the start location and end location to define a path, and a margin around the defined path is used as the planned flight area. In some embodiments, the user interface allows the pilot 108 to specify one or more altitude floors or ceilings for various portions of the planned flight area such that the planned flight area is a three-dimensional volume. In some embodiments, the pilot 108 may not specify any planned altitude information.

In some embodiments, the planned flight period of time may be specified by a planned flight start time and a planned flight end time, by a planned flight start time and a planned flight duration, or in any other suitable way. In some embodiments, various portions of the planned flight area may be associated with planned flight periods of time in which the aircraft 104 is expected to be within the portion of the planned flight area, such that the planned flight area may be considered a four-dimensional volume.

At block 316, a restriction analysis engine 214 retrieves an initial set of restriction definitions relevant to the planned flight area and the planned flight period of time from the restriction data store 208. In some embodiments, the restriction data store 208 stores the restriction definitions using S2 technologies to compress the geometry information to be searched against, and the S2 technologies are used to find restriction definitions that affect areas that intersect the planned flight area. In some embodiments, the restriction analysis engine 214 may simplify the initial search in order to generate a smaller data set to be compared to the full detail of the planned flight area and planned flight period of time. For example, the restriction analysis engine 214 may search the restriction data store 208 based on a two-dimensional projection of the planned flight area in order to reduce the complexity of the initial query, and may then compare the limited set of results to the full three-dimensional representation of the planned flight area and/or based on the planned flight period of time.

In some embodiments, the restriction analysis engine 214 may retrieve the initial set of restriction definitions (and the updated sets of restriction definitions discussed below) based on not just the planned flight area and the planned flight period of time, but also on one or more pieces of information stored in the user profile associated with the pilot 108, such as pilot attributes or aircraft attributes. For example, different restriction definitions may be retrieved for a first pilot 108 with a first license status than for a second pilot 108 with a different license status. As another example, different restriction definitions may be retrieved for a first aircraft 104 with a mass higher than a given threshold than for a second aircraft 104 with a mass lower than the given threshold. This will cause different presentations of sets of checklist items as discussed below for pilots having different pilot attributes and for aircraft having different aircraft attributes.

In some embodiments, the flight plan information may also include other information relevant to the flight, including but not limited to a type of flight to be performed (e.g., a recreational flight, a commercial non-licensed flight, a commercial licensed flight, a delivery, or an emergency flight). The type of flight to be performed may change the restriction definitions retrieved for a given flight, or the checklist items presented for a given flight, even with the same aircraft 104 and/or pilot 108. In some embodiments, the user device 106 may provide a user interface element that allows the pilot 108 to specify the type of flight.

At block 318, the restriction analysis engine 214 generates information for presenting a set of checklist items based on the initial set of restriction definitions. In some embodiments, the set of checklist items may indicate the presence or absence of various types of restrictions within the planned flight area or a portion thereof. For example, the set of checklist items may include whether or not the planned flight area includes permanent restricted airspace, fire hazards, a controlled airport/approach path/departure path, an uncontrolled airport, a danger area, a marine park, a no-fly zone, a heliport, a heliport with instrument approach, national parks, or restricted areas.

If the initial set of restriction definitions includes one or more of these types of items, the associated checklist items may be presented in a color indicating a failure (such as red) or with an icon indicating a failure (such as an X), or in a color indicating a warning (such as yellow) or with an icon indicating a warning (such as an exclamation point) (e.g., if there is a restriction definition that indicates a no-fly zone, a "no-fly zone" checklist item may be presented with a red X). For checklist items for which no restriction definitions are included in the initial set of restriction definitions, the associated checklist items may be presented in a color indicating success (such as green) or with an icon indicating success (such as a checkmark) (e.g, if there are no restriction definitions that indicate a no-fly zone, a "no-fly zone" checklist item may be presented with a green checkmark).

The method 300 then proceeds to a continuation terminal ("terminal A").

From terminal A (FIG. 3B), the method 300 proceeds to block 320, where the restriction analysis engine 214 transmits the information for presenting the set of checklist items to the user device 106. In some embodiments, the restriction analysis engine 214 may transmit the initial set of restriction definitions itself to the user device 106, and the user device 106 may make the comparison of the initial set of restriction definitions to the checklist items to determine colors/icons to be associated with each checklist item in the presentation. In some embodiments, the restriction analysis engine 214 may make the comparison, and may transmit the checklist item statuses to the user device 106 for presentation.

Figure 4A:
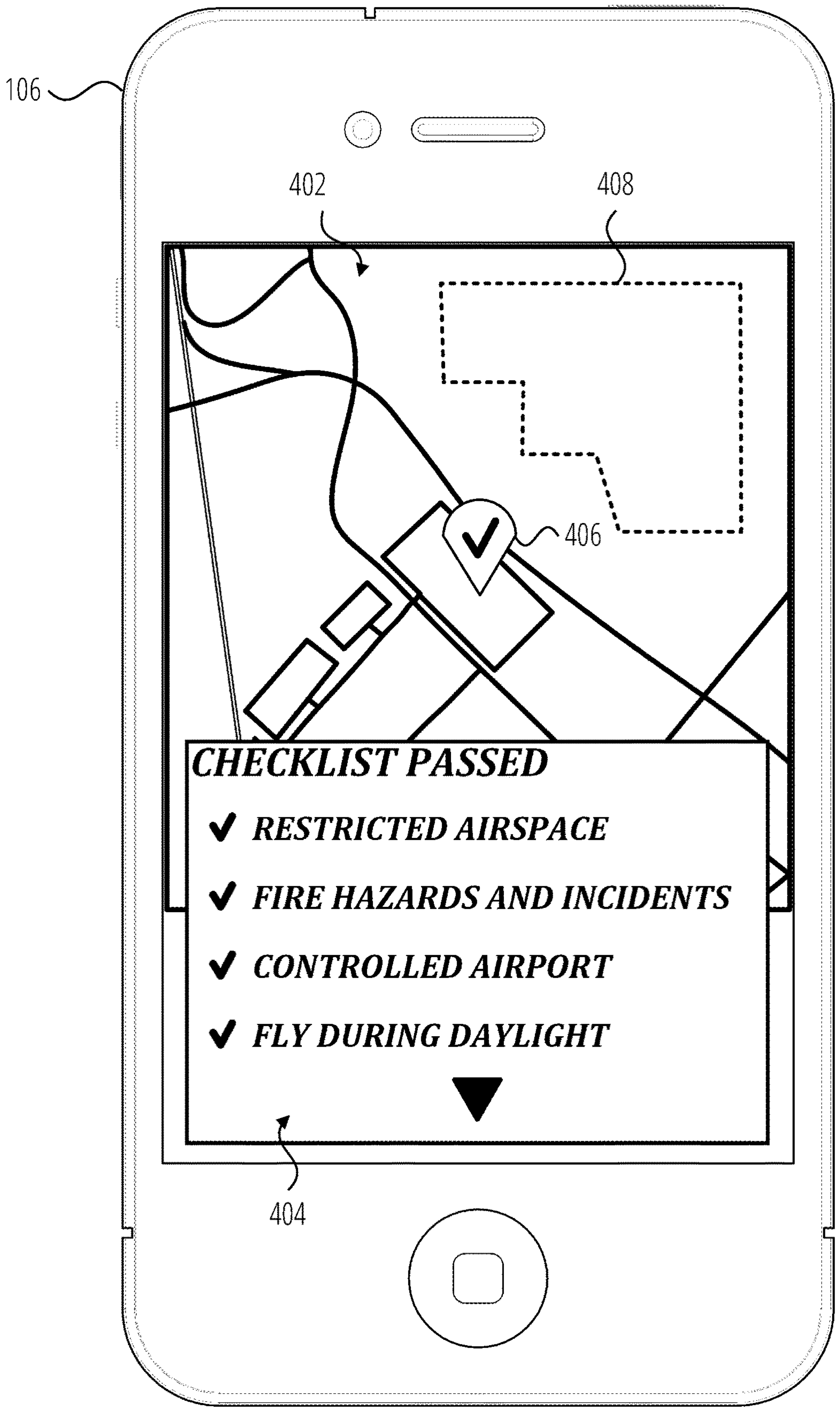
FIG. 4A-FIG. 4C are illustrations of a non-limiting example embodiment of a presentation of a set of checklist items made by a user device according to various aspects of the present disclosure.
Figure 4B:
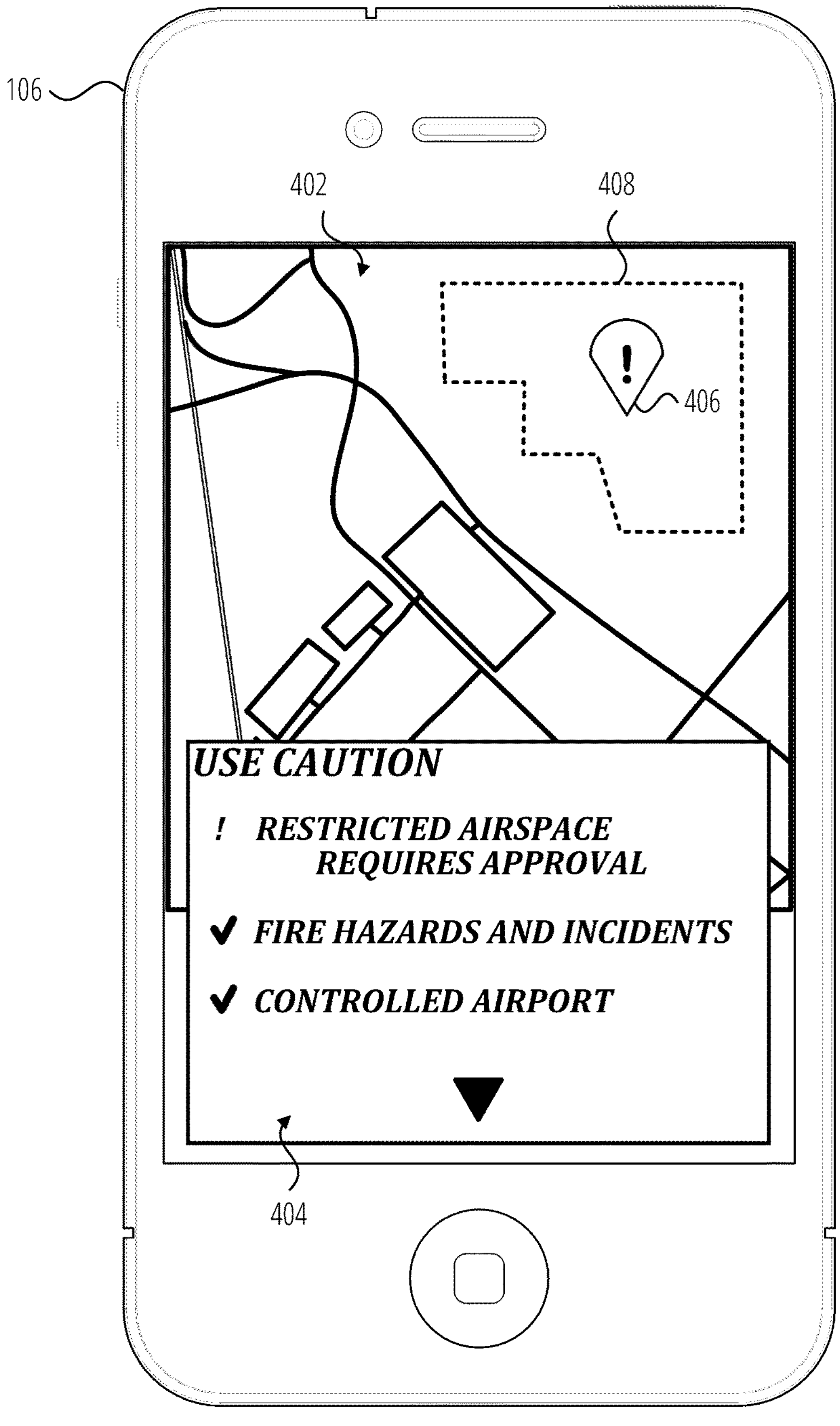
Figure 4C:
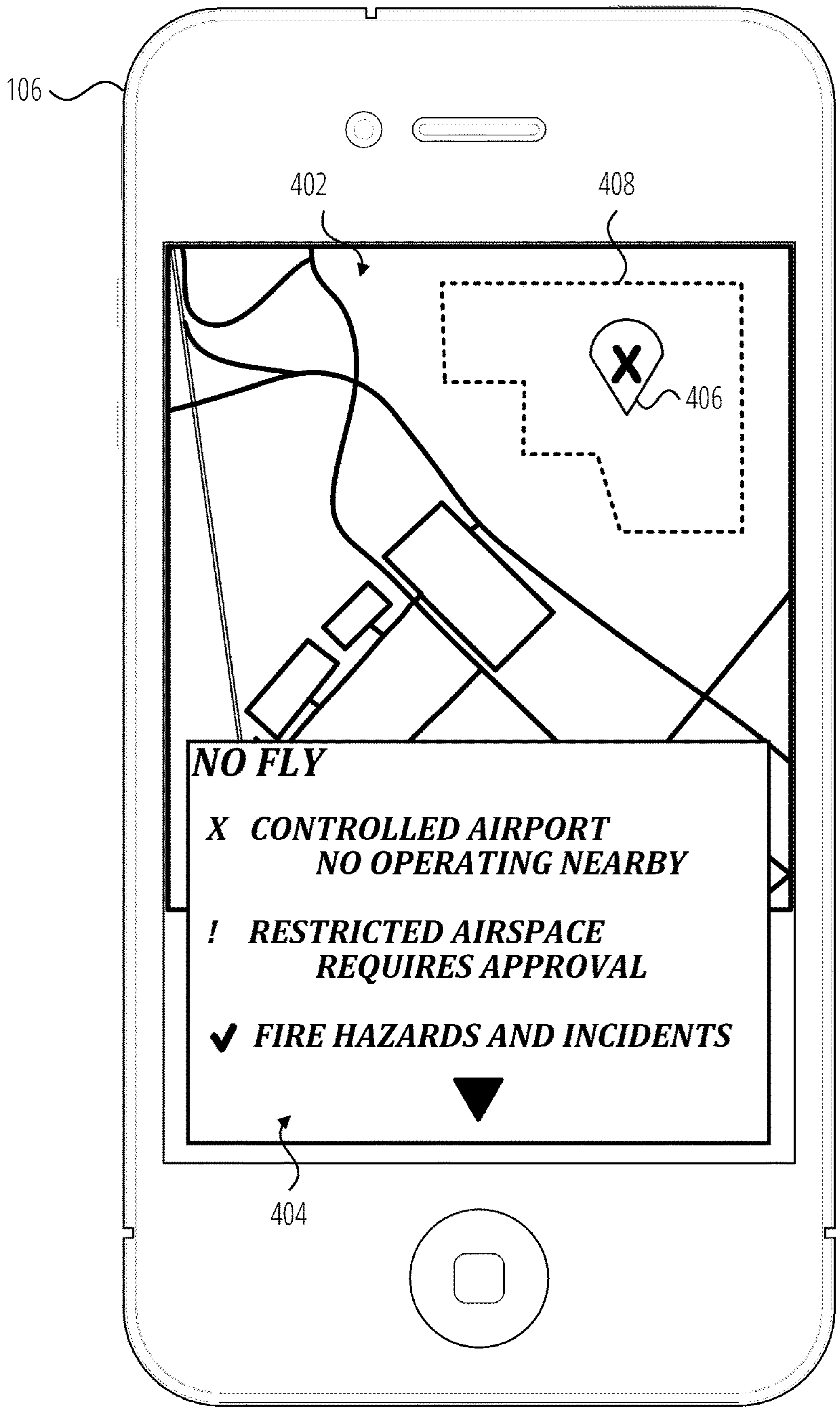

At block 322, the user device 106 presents the set of checklist items for the planned flight area. FIG. 4A-FIG. 4C illustrate a non-limiting example embodiment of a presentation of a set of checklist items made by a user device according to various aspects of the present disclosure.

FIG. 4A illustrates an example where the set of checklist items indicates that no restriction definitions are included in the initial set of restriction definitions for the checklist items. In FIG. 4A, the user device 106 displays a map 402 and a checklist 404. The checklist 404 is associated with the specific location indicated on the map 402 by a pin 406. The map 402 shows a restriction boundary 408 that was retrieved by the restriction analysis engine 214, but because the pin 406 is outside the restriction boundary 408, the checklist 404 does not reflect the restriction definition associated with the restriction boundary 408. As shown, each of the checklist items in the checklist 404 was not associated with a restriction definition for the location indicated by the pin 406, and so each checklist item in the checklist 404 includes a checkmark to indicate success. The checklist 404 also includes a heading that indicates that all checklist items passed, and the pin 406 includes a checkmark to further indicate that all checklist items passed. Further checklist items may be available and accessible by tapping on the arrow at the bottom of the checklist 404.

In some embodiments, the specific status of the items in the checklist 404 may change by moving the location indicated by the pin 406. In some embodiments, the pilot 108 may drag the pin 406 to different portions of the map 402 to check restrictions in other locations. In some embodiments, the pilot 108 may scroll the map 402 under the pin 406 to check restrictions in other locations.

FIG. 4B illustrates an example where the pin 406 has been moved to be within the restriction boundary 408. For the purposes of FIG. 4B, the restriction definition associated with the restriction boundary 408 indicates restricted airspace that requires approval before operating aircraft therein, and the pilot 108 should be warned about operating within the restriction boundary 408. Accordingly, when the pin 406 is within the restriction boundary 408, the checkmark within the pin 406 has changed to an exclamation point. Further, the heading of the checklist 404 has changed to "Use Caution," and the "restricted airspace" checklist item is now associated with an exclamation point instead of a checkmark in the checklist 404. The "restricted airspace" checklist item has also been augmented with additional information relating to the restriction. This information may be provided as part of the restriction definition.

FIG. 4C illustrates another example where the pin 406 has been moved to be within the restriction boundary 408. For the purposes of FIG. 4C, multiple restriction definitions are associated with the restriction boundary 408: the restriction definition of FIG. 4B that indicated that the airspace requires approval, and another restriction definition that indicates that the location is associated with a controlled airport. Because aircraft operations are not allowed near the controlled airport, the pin 406 now displays an X and the heading of the checklist 404 has changed to "No Fly." The "controlled airspace" checklist item is now associated with a X in the checklist 404, and the "restricted airspace" checklist item is associated with the same exclamation point as FIG. 4B. One will note that due to the higher severity of the "controlled airport" restriction, the "controlled airport" checklist item has been sorted to the top of the checklist 404, followed by the warning checklist items, followed by the successful checklist items. By providing clear indications of pass/warning/fail conditions for the checklist items, by providing overall pass/warning/fail indications on the pin 406 and in the header of the checklist 404, and by reordering the checklist 404 to put the highest severity issues at the top, the interface presented on the user device 106 helps overcome the small display real estate available on the user device 106 and the relatively imprecise touch-based input on the user device 106 to nevertheless provide a highly useful review of flight restrictions relevant to the planned flight area.

Returning to FIG. 3B, at decision block 324, a determination is made regarding whether the planned flight has taken off yet. In some embodiments, this may occur by the restriction analysis engine 214 comparing a current time to the planned flight period of time. In some embodiments, this may occur by the restriction analysis engine 214 receiving telemetry information from the aircraft 104, and determining that the planned flight has begun based on the telemetry information. In these embodiments, if the planned flight period of time has started but the telemetry information does not indicate that the flight has begun, the restriction analysis engine 214 may update the planned flight period of time based on the current time.

If the flight has not yet taken off, then the result of decision block 324 is NO, and the method 300 proceeds to subroutine block 326. At subroutine block 326, the restriction management system 110 updates restriction definitions stored in the restriction data store 208. Any suitable technique may be used at subroutine block 326 to update the restriction definitions stored in the restriction data store 208, including but not limited to the procedure 500 illustrated in FIG. 5 and discussed in further detail below. Typically, the actions of subroutine block 326 are similar to the actions of subroutine block 312 of FIG. 3A.

At block 328, the restriction analysis engine 214 waits an amount of time based on a time remaining before the planned flight period of time, and at block 330, the restriction analysis engine 214 retrieves an updated set of restriction definitions relevant to the planned flight area and the planned flight period of time from the restriction data store 208. Similar techniques may be used to retrieve the updated set of restriction definitions as were used to retrieve the initial set of restriction definitions at block 316.

At a high level, the method 300 is repeatedly checking for updated restriction definitions relevant to a planned flight area and a planned flight period of time at a rate that increases over time. By waiting for an amount of time based on a time remaining before the planned flight period of time at block 328, the method 300 can conserve computing and communication resources at times long before the planned flight period of time when having up-to-date information is of lesser importance, and can prioritize the accuracy and timeliness of the information closer to the planned flight period of time when having up-to-date information is of higher importance.

For example, in some embodiments, the amount of time that the restriction analysis engine 214 waits at block 328 decreases the closer the current time is to the beginning of the planned flight period of time, such that the actions after block 328 occur more frequently the closer the current time is to the beginning of the planned flight period of time. In some embodiments, the amount of time the restriction analysis engine 214 waits may decay exponentially before the planned flight period of time. In some embodiments, the amount of time the restriction analysis engine 214 waits may shrink based on an amount of time until the planned flight period of time to a minimum threshold amount of time, at which point the amount of time will remain at the minimum threshold amount of time.

In some embodiments, obtaining the benefits of decreasing the amount of time the restriction analysis engine 214 waits at block 328 may not be needed. For example, the amount of time between the current time and the planned flight period of time may be small enough that the benefits of changing the frequency of checking for updated restriction definitions over time may not be noticeable. As another example, the number of aircraft 104, pilots 108, or planned flights managed by the restriction management system 110 may be small enough that conservation of computing power and/or communication bandwidth may not be necessary. As yet another example, the computing power and/or communication bandwidth available to the restriction management system 110 may be large enough that the benefits gained by decreasing the amount of time the restriction analysis engine 214 waits may not noticeably improve performance of the restriction management system 110. In such embodiments, the restriction analysis engine 214 may wait for a constant amount of time at block 328 on multiple iterations of the method 300.

At decision block 332, a determination is made regarding whether there are any changes between the initial set of restriction definitions and the updated set of restriction definitions. In some embodiments, the restriction analysis engine 214 may store a record of the initial set of restriction definitions, and may compare the updated set of restriction definitions to the stored initial set of restriction definitions to determine whether there are any changes. In some embodiments, the updated set of restriction definitions may only include restriction definitions that were newly stored in the restriction data store 208 or updated in the restriction data store 208 since the previous query at block 316, and so the determination at decision block 332 may be based on whether the updated set of restriction definitions is empty.

If there are no changes between the initial set of restriction definitions and the updated set of restriction definitions, then the result of decision block 332 is NO, and the method 300 returns to decision block 324 to continue to monitor for changes in the restriction definitions. Otherwise, if there are changes between the initial set of restriction definitions and the updated set of restriction definitions, the result of decision block 332 is YES, and the method 300 proceeds to block 334.

At block 334, the restriction analysis engine 214 generates information for presenting an updated set of checklist items based on the updated set of restriction definitions. In some embodiments, the information and the generation thereof may be similar to the generation of the information for presenting the set of checklist items described above at block 318, but using the updated set of restriction definitions (or a combination of the initial set of restriction definitions along with the updated set of restriction definitions, if the updated set of restriction definitions only includes new/updated restriction definitions instead of all relevant restriction definitions).

At block 336, the restriction analysis engine 214 transmits a notification to the user device 106. The restriction analysis engine 214 may use any suitable technique or combination of techniques to transmit the notification to the user device 106, including but not limited to a push notification supported by an operating system of the user device 106 (including but not limited to an Apple Push Notification service (APNs) notification or a Google Cloud Messaging notification), an application-directed SMS message, an email, and an HTTP push. In some embodiments, the addressing information, device tokens, and/or other information for transmitting the notification to the user device 106 is stored in the user profile for use at block 336.

At block 338, the restriction analysis engine 214 transmits the information for presenting the updated set of checklist items to the user device 106. In some embodiments, the information for presenting the updated set of checklist items may be included in the notification transmitted in block 336. In some embodiments, the notification transmitted in block 336 may merely indicate the existence of the information, and the user device 106 may retrieve the information for presenting the updated set of checklist items from the restriction analysis engine 214 in response to receiving the notification.

The method 300 then returns to decision block 324 to monitor for further changes to the restriction definitions. On subsequent iterations, the set of updated restriction definitions will also be considered at decision block 332 when determining whether any changes are present in the newly updated set of restriction definitions.

Returning to decision block 324, if it is determined that the flight has taken off, then the result of decision block 324 is YES, and the method 300 proceeds to a continuation terminal ("terminal B"). In some embodiments, proceeding to terminal B could be optional. In such embodiments, the method 300 may terminate if the result of decision block 324 is YES, or may terminate at the start of the planned flight period of time.

From terminal B (FIG. 3C), the method 300 proceeds to block 340, where the aircraft 104 transmits telemetry information to the restriction management system 110. In some embodiments, the telemetry information may include information regarding the status of the aircraft 104, including but not limited to position, altitude, attitude, and/or speed information.

At decision block 342, a determination is made regarding whether the flight is done. In some embodiments, the determination at decision block 342 may be based on whether the reported speed, altitude, and position of the aircraft 104 indicate that the aircraft 104 has landed and/or reached a planned end location of the planned flight area. In some embodiments, the determination at decision block 342 may be based on whether the pilot 108 has indicated to a user interface provided by the user device 106 that the flight is done.

If the determination is that the flight is not done, then the result of decision block 342 is NO, and the method 300 proceeds to block 344. At block 344, the restriction analysis engine 214 compares the telemetry information to the flight plan information, and at decision block 346, a determination is made regarding whether the telemetry information matches the flight plan information. In some embodiments, the comparison includes the restriction analysis engine 214 comparing the position, altitude, and/or other elements of the telemetry information to the planned flight area and the planned flight period of time to determine whether the position, altitude, and/or other elements are still within the planned flight area during the planned flight period of time.

If the determination is that the telemetry information does match the flight plan information, then the result of decision block 346 is YES, and the method 300 returns to block 340 to monitor further telemetry information. Otherwise, if the determination is that the telemetry information does not match the flight plan information, then the result of decision block 346 is NO, and the method 300 proceeds to block 348.

At block 348, the restriction analysis engine 214 updates the flight plan information to encompass the telemetry information. In some embodiments, the restriction analysis engine 214 may update the planned flight area to include a position/altitude of the aircraft 104 indicated by the telemetry information. In some embodiments, the restriction analysis engine 214 may update the planned flight area to include this position/altitude plus a predetermined radius or volume around the position/altitude indicated by the telemetry information. In some embodiments, the restriction analysis engine 214 may consider the attitude and speed of the aircraft 104 in determining an area or volume to add to the planned flight area (e.g., the restriction analysis engine 214 may add more area in a direction of travel of the aircraft 104, and less area in other directions).

In some embodiments, the restriction analysis engine 214 may update the planned flight period of time to include at least the current time indicated by the telemetry information. In some embodiments, the restriction analysis engine 214 may update the planned flight period of time to include not only the current time indicated by the telemetry information, but also a predetermined additional amount of time. In some embodiments, the restriction analysis engine 214 may update the planned flight period of time to include the current time indicated by the telemetry information and a predicted amount of time remaining in the flight. The predicted amount of time remaining in the flight may be determined using any suitable technique, including but not limited to determining an amount of charge left in a battery of the aircraft 104 or determining an amount of time it would take the aircraft 104 to reach an endpoint of the flight from its current position.

At block 350, the restriction analysis engine 214 retrieves a new set of restriction definitions relevant to the updated flight plan information from the restriction data store 208. In some embodiments, the new set of restriction definitions is retrieved using techniques similar to those used in block 316 to retrieve the initial set of restriction definitions and/or in block 330 to retrieve the updated set of restriction definitions.

At decision block 352, a determination is made regarding whether there are any changes between the new set of restriction definitions and the initial set of restriction definitions. Again, in some embodiments, the determination is made using similar techniques to those described at decision block 332, but with the new set of restriction definitions being compared to the initial set of restriction definitions. In some embodiments, if an updated set of restriction definitions was determined to have changes at decision block 332, then the comparison at decision block 352 may be performed between the new set of restriction definitions and a combination of the initial set of restriction definitions and the updated set of restriction definitions.

If it is determined that there are no changes between the new set of restriction definitions and the initial set of restriction definitions, then the result of decision block 352 is NO, and the method 300 again returns to block 340 to monitor further telemetry information. Otherwise, if there are changes between the new set of restriction definitions and the initial set of restriction definitions, then the result of decision block 352 is YES, and the method 300 proceeds to block 354.

At block 354, the restriction analysis engine 214 generates information for presenting a new set of checklist items based on the new set of restriction definitions, at block 356, the restriction analysis engine 214 transmits a notification to the user device 106, and a block 358, the restriction analysis engine 214 transmits the information for presenting the new set of checklist items to the user device 106. The actions of blocks 354-358 are similar to those discussed above in blocks 334-338, and so are not discussed here in detail again for the sake of brevity. One difference is that, in some embodiments, if there are any checklist items that are newly indicated as a failure in the new set of checklist items, additional actions may be taken by the restriction analysis engine 214, including but not limited to transmitting a command to the aircraft 104 to land immediately or otherwise cause the failed checklist item to be addressed.

The method 300 then returns to block 340 to monitor further telemetry information.

Figure 5:
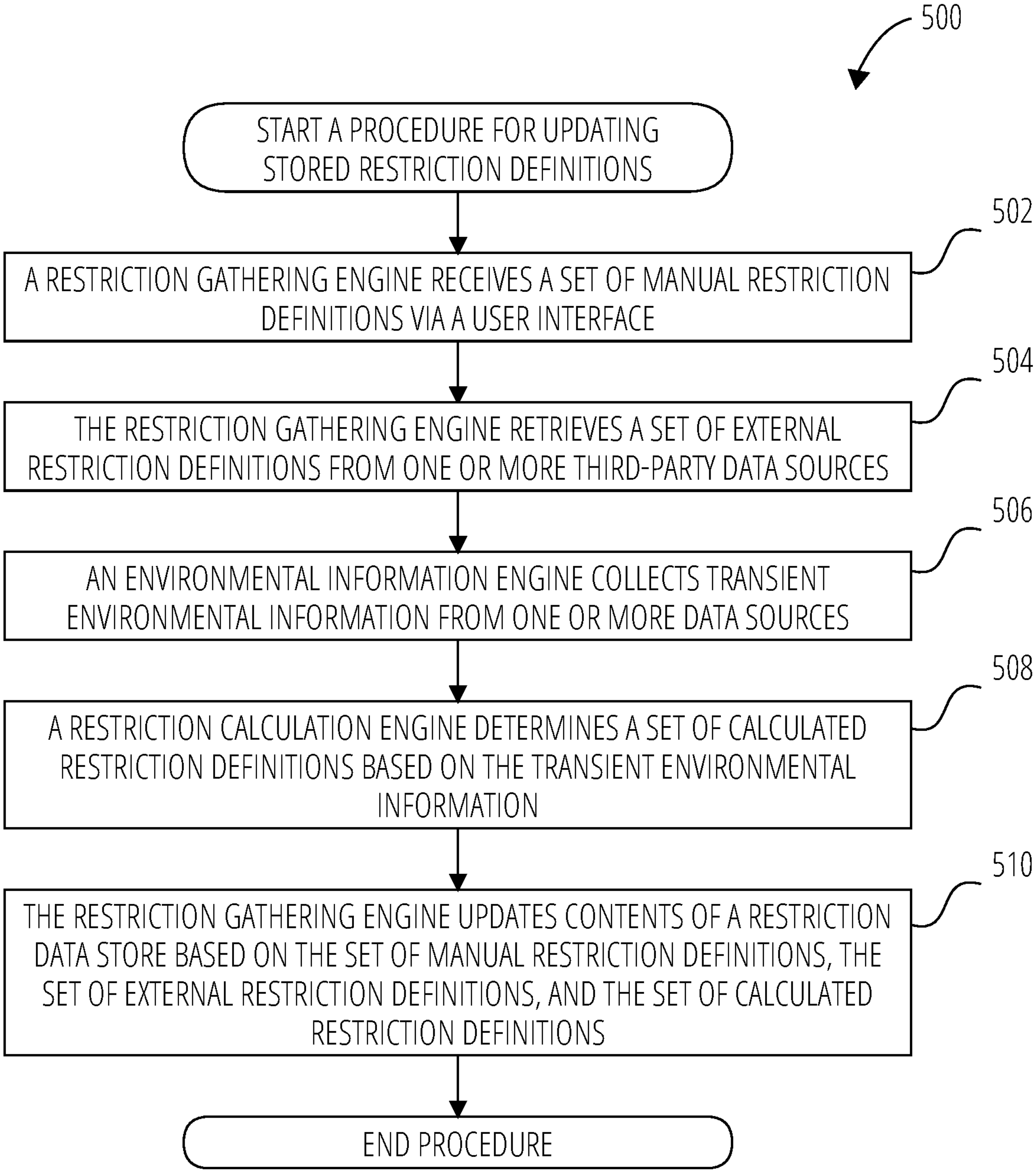
FIG. 5 is a flowchart illustrating a non-limiting example embodiment of a procedure for updating stored restriction definitions according to various aspects of the present disclosure.

FIG. 5 is a flowchart illustrating a non-limiting example embodiment of a procedure for updating stored restriction definitions according to various aspects of the present disclosure. The procedure 500 illustrated in FIG. 5 is a non-limiting example of a procedure suitable for use at subroutine block 312 and/or subroutine block 326 of the method 300 described above. In the procedure 500, the restriction management system 110 gathers restriction definitions from various sources and adds/updates restriction definitions stored in the restriction data store 208 as appropriate.

Each restriction definition may include various features that define the associated flight restriction. For example, in some embodiments each restriction definition may define an area or a volume covered by the restriction. As another example, in some embodiments each restriction definition may include a start time and end time for the restriction, or a period of the day during which the restriction is in effect. As yet another example, in some embodiments each restriction definition may include a type of the restriction, wherein the type specifies what conditions are represented by the restriction definition.

Many different types of restrictions may be represented by the restriction definitions. As some non-limiting examples, types of restrictions may include temporary or permanent no-fly zones (in which no operations are permitted), fire hazards (in which operations that pose fire risks are not allowed), a controlled airport/approach path/departure path (in which unlicensed operations may be restricted but licensed and permitted operations may be allowed), an uncontrolled airport (in which unlicensed operations may be restricted but licensed operations may be allowed), a danger area, a marine park, a heliport, a heliport with instrument approach, national parks, or any other type of restriction on aircraft operation. In some embodiments, each type of restriction is associated with a checklist item as discussed above.

From a start block, the procedure 500 proceeds to block 502, where a restriction gathering engine 212 receives a set of manual restriction definitions via a user interface. In some embodiments, the restriction gathering engine 212 may generate the user interface, which may accept input from users for defining the manual restriction definitions using any suitable technique. As one non-limiting example, the restriction gathering engine 212 may present a map interface that allows a user to select a point and a radius, to draw an outline, or to specify an area for the restriction definition using the map in any other way. The interface may also allow a user to specify an altitude ceiling and/or floor for the restriction definition, a time period during which the restriction definition is in effect, and a type for the restriction definition.

At block 504, the restriction gathering engine 212 retrieves a set of external restriction definitions from one or more third-party data sources. In some embodiments, the restriction gathering engine 212 may query one or more third-party data sources, such as governmental agencies or commercial sources of flight planning information, to obtain the external restriction definitions.

At block 506, an environmental information engine 216 collects transient environmental information from one or more data sources, and at block 508, a restriction calculation engine 210 determines a set of calculated restriction definitions based on the transient environmental information. In some embodiments, transient environmental information may include past weather condition information, current weather condition information, and/or future weather prediction information, and the set of calculated restriction definitions may include restriction types based on the weather information. As a non-limiting example, the environmental information engine 216 may retrieve weather prediction information that indicates a given area is expected to experience high winds at a given time. The restriction calculation engine 210 may then create a restriction definition of a type that indicates that operation of aircraft under a certain weight is dangerous or forbidden within the given area.

At block 510, the restriction gathering engine 212 updates contents of a restriction data store 208 based on the set of manual restriction definitions, the set of external restriction definitions, and the set of calculated restriction definitions. In some embodiments, the restriction gathering engine 212 may normalize the format of the manual restriction definitions, the external restriction definitions, and the calculated restriction definitions to each be in a matching format used by the restriction data store 208.

In some embodiments, the restriction gathering engine 212 may check whether the restriction data store 208 already includes the restriction definitions before adding them to the restriction data store 208. If the restriction data store 208 does not yet include a given restriction definition, then the restriction gathering engine 212 may simply add the given restriction definition to the restriction data store 208. If the restriction data store 208 does include the given restriction definition, the restriction gathering engine 212 may check to see if there are any differences between the stored version of the restriction definition and the given restriction definition. If there are no differences, the restriction gathering engine 212 may skip adding the given restriction definition to the restriction data store 208, but if there are differences, then the restriction gathering engine 212 may either update the stored restriction definition to match the given restriction definition or may delete the stored restriction definition and may replace it with the given restriction definition. In some embodiments, when adding or updating restriction definitions stored in the restriction data store 208, the restriction gathering engine 212 may include a timestamp, thus allowing the restriction analysis engine 214 to be able to retrieve restriction definitions added or updated after a given time.

The procedure 500 then proceeds to an end block and returns control to its caller.

Figure 6:
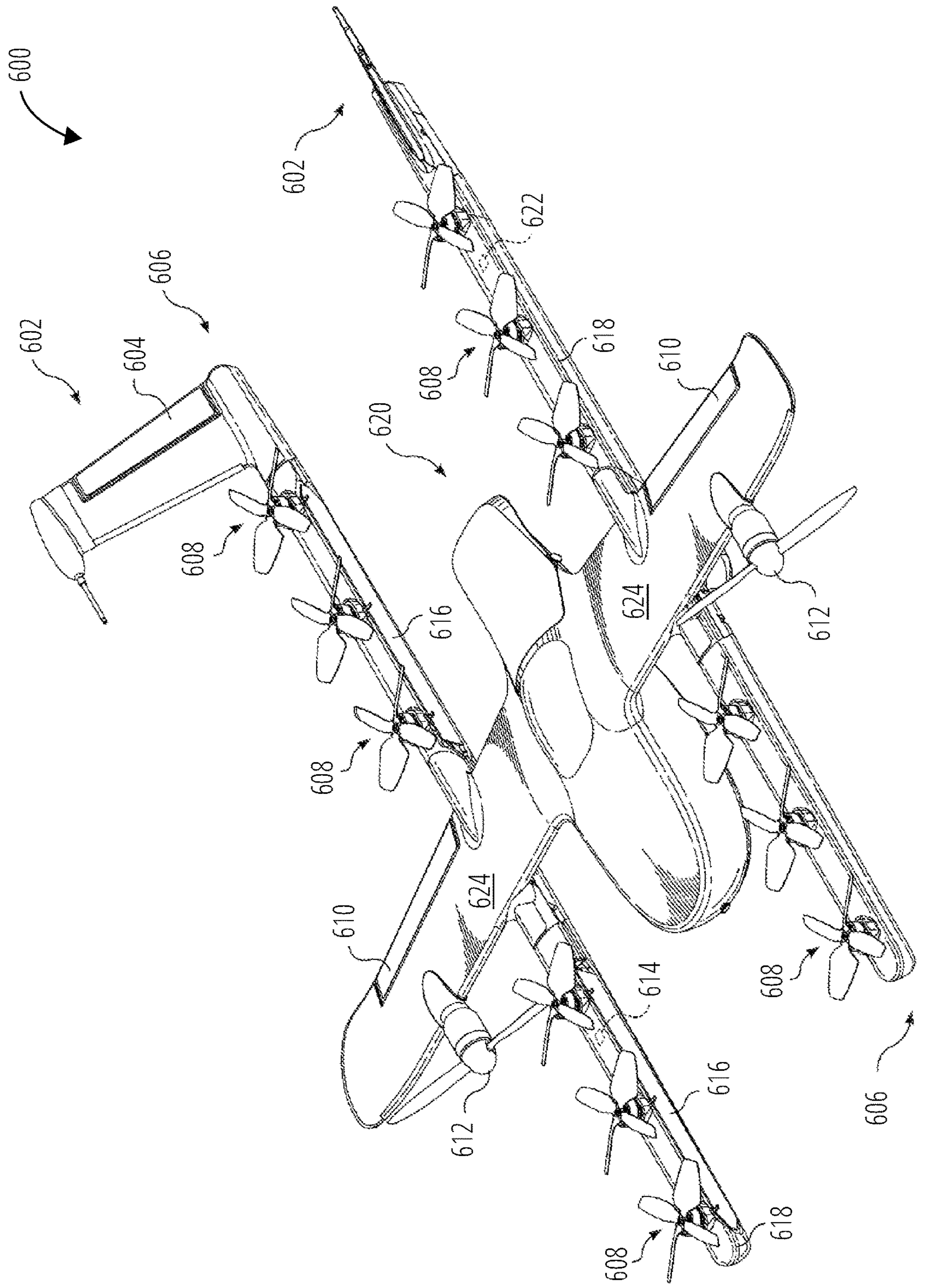
FIG. 6 and FIG. 7 illustrate a non-limiting example of an aircraft in accordance with various aspects of the present disclosure.
Figure 7:
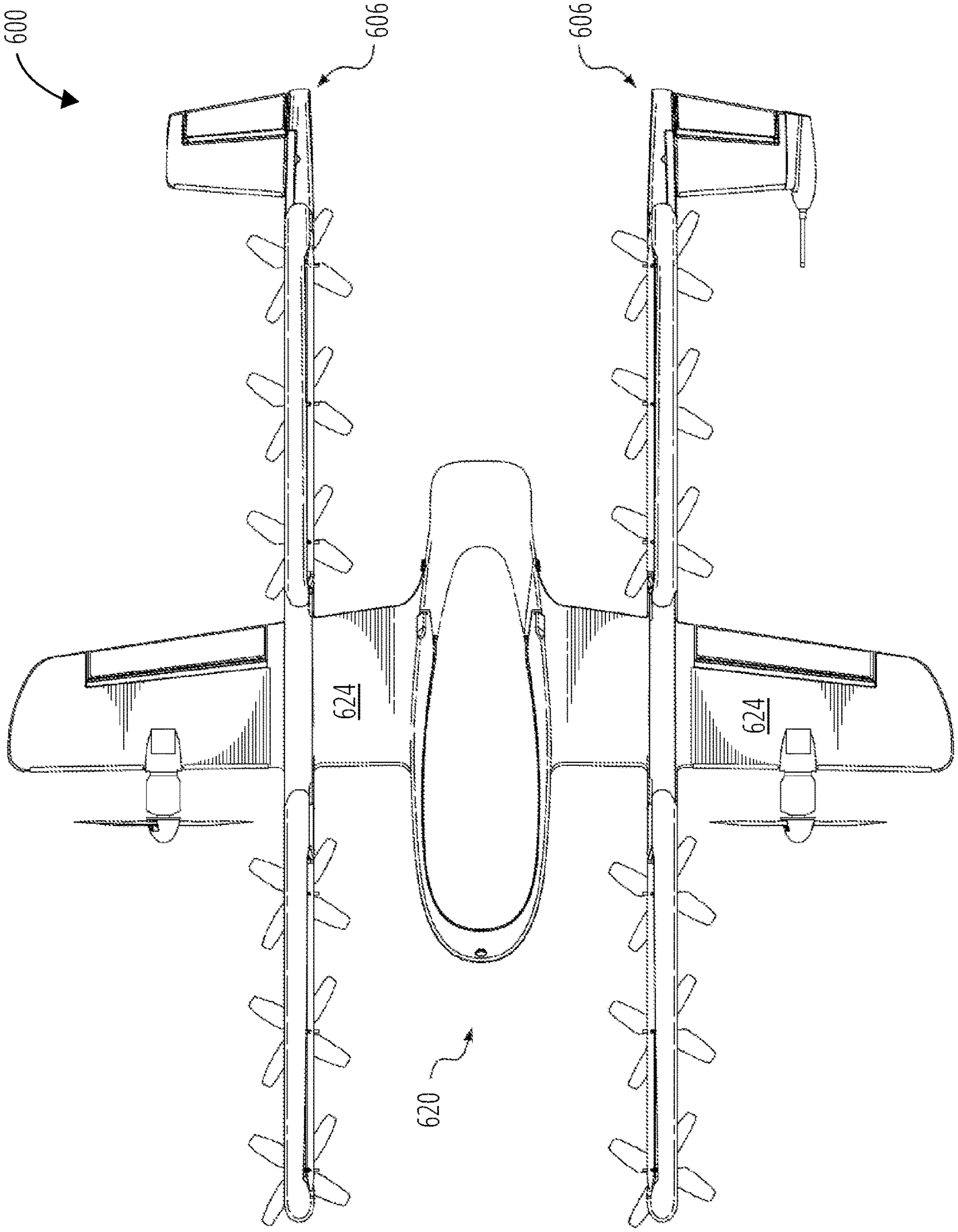

FIG. 6 and FIG. 7 illustrate a non-limiting example of an aircraft in accordance with various aspects of the present disclosure. The illustrated embodiment of an unmanned aerial vehicle (UAV 600) is a vertical takeoff and landing (VTOL) unmanned aerial vehicle (UAV) that includes separate propulsion units 612 and propulsion units 608 for providing horizontal and vertical propulsion, respectively. UAV 600 is a fixed-wing aerial vehicle, which as the name implies, has a wing assembly 624 that can generate lift based on the wing shape and the vehicle's forward airspeed when propelled horizontally by propulsion units 612. FIG. 6 is a perspective top view illustration of UAV 600 while FIG. 7 is a bottom side plan view illustration of UAV 600.

The illustrated embodiment of UAV 600 includes a fuselage 620. In one embodiment, fuselage 620 is modular and includes a battery module, an avionics module, and a mission payload module. These modules are detachable from each other and mechanically securable to each other to contiguously form at least a portion of the fuselage 620 or UAV main body.

The battery module includes a cavity for housing one or more batteries for powering UAV 600. The avionics module houses flight control circuitry of UAV 600, which may include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). The mission payload module houses equipment associated with a mission of UAV 600. For example, the mission payload module may include a payload actuator for holding and releasing an externally attached payload. In another embodiment, the mission payload module may include a camera/sensor equipment holder for carrying camera/sensor equipment (e.g., camera, lenses, radar, LIDAR, pollution monitoring sensors, weather monitoring sensors, etc.).

The illustrated embodiment of UAV 600 further includes horizontal propulsion units 612 positioned on wing assembly 624, which can each include a motor, shaft, motor mount, and propeller, for propelling UAV 600. The illustrated embodiment of UAV 600 includes two boom assemblies 606 that secure to wing assembly 624.

The illustrated embodiments of boom assemblies 606 each include a boom housing 618 in which a boom is disposed, vertical propulsion units 608, printed circuit boards 616, and stabilizers 602. Vertical propulsion units 608 can each include a motor, shaft, motor mounts, and propeller, for providing vertical propulsion. Vertical propulsion units 608 may be used during a hover mode where UAV 600 is descending (e.g., to a delivery location) or ascending (e.g., following a delivery). Stabilizers 602 (or fins) may be included with UAV 600 to stabilize the UAV's yaw (left or right turns) during flight. In some embodiments, UAV 600 may be configured to function as a glider. To do so, UAV 600 may power off its propulsion units and glide for a period of time.

During flight, UAV 600 may control the direction and/or speed of its movement by controlling its pitch, roll, yaw, and/or altitude. For example, the stabilizers 602 may include one or more rudders 604 for controlling the UAV's yaw, and wing assembly 624 may include elevators for controlling the UAV's pitch and/or ailerons 610 for controlling the UAV's roll. As another example, increasing or decreasing the speed of all the propellers simultaneously can result in UAV 600 increasing or decreasing its altitude, respectively. The UAV 600 may also include components for sensing the environment around the UAV 600, including but not limited to audio sensor 622 and audio sensor 614.

Many variations on the illustrated fixed-wing aerial vehicle are possible. For instance, aerial vehicles with more wings (e.g., an "x-wing" configuration with four wings), are also possible. Although FIG. 6 and FIG. 7 illustrate one wing assembly 624, two boom assemblies 606, two horizontal propulsion units 612, and six vertical propulsion units 608 per boom assembly 606, it should be appreciated that other variants of UAV 600 may be implemented with more or fewer of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on. In some embodiments, UAV 600 may be fully controlled by a remote pilot, with little to no autonomous capability.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A mobile computing device, comprising:

one or more processors;

a display; and a non-transitory computer-readable medium having logic stored thereon that, in response to execution by the one or more processors, causes the mobile computing device to perform actions comprising:

determining, by the mobile computing device, a location associated with flight plan information;

transmitting, by the mobile computing device, the location to a restriction management system;

receiving, by the mobile computing device from the restriction management system, information for presenting a checklist including checklist items indicating statuses of flight restriction conditions associated with the location;

generating, by the mobile computing device, an interface having a format based on whether all checklist items are passed, wherein the interface includes a map, a pin, and a checklist;

presenting, by the mobile computing device, the interface on the display;

receiving, by the mobile computing device, an input from a user that indicates a new location;

transmitting, by the mobile computing device, the new location to the restriction management system;

receiving, by the mobile computing device from the restriction management system, information for presenting an updated checklist of flight restriction conditions relevant to the new location; and updating, by the mobile computing device, the interface based on the updated checklist.

2. The mobile computing device of claim 1, wherein generating the interface includes:

in response to determining that all checklist items indicate pass statuses, rendering the pin in a first format; and in response to determining that not all checklist items indicate pass statuses, rendering the pin in a second format different from the first format.

3. The mobile computing device of claim 2, wherein the first format includes a first color, and wherein the second format includes a second color different from the first color.

4. The mobile computing device of claim 2, wherein the first format includes a first icon, and wherein the second format includes a second icon different from the first icon.

5. The mobile computing device of claim 1, wherein generating the interface includes:

in response to determining that at least one checklist item does not indicate a pass status, sorting the checklist such that the at least one checklist item that does not indicate a pass status is at a top of the checklist.

6. The mobile computing device of claim 1, wherein generating the interface includes:

in response to determining that all checklist items indicate pass statuses, rendering the checklist with a first heading; and in response to determining that not all checklist items indicate pass statuses, rendering the checklist with a second heading different from the first heading.

7. The mobile computing device of claim 1, wherein the input from the user that indicates the new location is an input that causes the map to scroll while the pin remains stationary.

8. The mobile computing device of claim 1, wherein the input from the user that indicates the new location is an input that causes the pin to move while the map remains stationary.

9. The mobile computing device of claim 1, wherein the map includes a restriction boundary associated with a restriction definition.

10. A non-transitory computer-readable medium having logic stored thereon that, in response to execution by one or more processors of a mobile computing device, causes the mobile computing device to perform actions comprising:

determining, by the mobile computing device, a location associated with flight plan information;

transmitting, by the mobile computing device, the location to a restriction management system;

receiving, by the mobile computing device from the restriction management system, information for presenting a checklist including checklist items indicating statuses of flight restriction conditions associated with the location;

generating, by the mobile computing device, an interface having a format based on whether all checklist items are passed, wherein the interface includes a map, a pin, and a checklist;

presenting, by the mobile computing device, the interface on a display device of the mobile computing device;

receiving, by the mobile computing device, an input from a user that indicates a new location;

transmitting, by the mobile computing device, the new location to the restriction management system;

receiving, by the mobile computing device from the restriction management system, information for presenting an updated checklist of flight restriction conditions relevant to the new location; and updating, by the mobile computing device, the interface based on the updated checklist.

11. The non-transitory computer-readable medium of claim 10, wherein generating the interface includes:

in response to determining that all checklist items indicate pass statuses, rendering the pin in a first format; and in response to determining that not all checklist items indicate pass statuses, rendering the pin in a second format different from the first format.

12. The non-transitory computer-readable medium of claim 11, wherein the first format includes a first color, and wherein the second format includes a second color different from the first color.

13. The non-transitory computer-readable medium of claim 11, wherein the first format includes a first icon, and wherein the second format includes a second icon different from the first icon.

14. The non-transitory computer-readable medium of claim 10, wherein generating the interface includes:

in response to determining that at least one checklist item does not indicate a pass status, sorting the checklist such that the at least one checklist item that does not indicate a pass status is at a top of the checklist.

15. The non-transitory computer-readable medium of claim 10, wherein generating the interface includes:

in response to determining that all checklist items indicate pass statuses, rendering the checklist with a first heading; and in response to determining that not all checklist items indicate pass statuses, rendering the checklist with a second heading different from the first heading.

16. The non-transitory computer-readable medium of claim 10, wherein the input from the user that indicates the new location is an input that causes the map to scroll while the pin remains stationary.

17. The non-transitory computer-readable medium of claim 10, wherein the input that indicates the new location is an input that causes the pin to move while the map remains stationary.

18. The non-transitory computer-readable medium of claim 10, wherein the map includes a restriction boundary associated with a restriction definition.

* * * * *